(12) United States Patent
Makino et al.

(10) Patent No.: US 11,631,357 B2
(45) Date of Patent: Apr. 18, 2023

(54) DISPLAY DEVICE FOR MUSICAL INSTRUMENT AND DISPLAY SWITCHING METHOD OF DISPLAY DEVICE FOR MUSICAL INSTRUMENT

(71) Applicant: YAMAHA CORPORATION, Hamamatsu (JP)

(72) Inventors: Takaaki Makino, Hamamatsu (JP); Koichi Matsuno, Fukuroi (JP); Takashi Handa, Hamamatsu (JP); Haruo Okuyama, Hamamatsu (JP); Yosuke Harada, Hamamatsu (JP); Akihiro Nagayama, Hamamatsu (JP)

(73) Assignee: YAMAHA CORPORATION, Hamamatsu (JP)

(*) Notice: Subject to any disclaimer, the term of this patent is extended or adjusted under 35 U.S.C. 154(b) by 0 days.

(21) Appl. No.: 17/168,588

(22) Filed: Feb. 5, 2021

(65) Prior Publication Data
US 2021/0248946 A1 Aug. 12, 2021

(30) Foreign Application Priority Data
Feb. 6, 2020 (JP) .............................. JP2020-019141

(51) Int. Cl.
G09G 3/20 (2006.01)
G06F 3/147 (2006.01)
G06F 3/041 (2006.01)

(52) U.S. Cl.
CPC ........... *G09G 3/2003* (2013.01); *G06F 3/041* (2013.01); *G06F 3/147* (2013.01)

(58) Field of Classification Search
CPC ....... G09G 3/2003; G06F 3/041; G06F 3/147; G10H 1/0008; G10H 1/34
See application file for complete search history.

(56) References Cited

U.S. PATENT DOCUMENTS

| | | | |
|---|---|---|---|
| 7,499,003 B2* | 3/2009 | Rudolph | F24C 7/086 345/39 |
| 2003/0150853 A1 | 8/2003 | Kang | |
| 2005/0162401 A1 | 7/2005 | Tseng | |
| 2006/0109258 A1 | 5/2006 | Takisawa | |
| 2006/0191917 A1 | 8/2006 | Kang | |

(Continued)

FOREIGN PATENT DOCUMENTS

| | | |
|---|---|---|
| JP | S63289632 A | 11/1988 |
| JP | 2003240243 A | 8/2003 |

(Continued)

OTHER PUBLICATIONS

"CS11/CS11W . Digital Piano . Product Information" Kawai Musical Instruments Manufacturing Co., Ltd. 2017. p. 16. Partial English machine translation provided.

*Primary Examiner* — Sahlu Okebato
(74) *Attorney, Agent, or Firm* — Rossi, Kimms & McDowell LLP

(57) ABSTRACT

A display device for a musical instrument includes a touch panel and a switcher. The touch panel is placed to be adjacent to an exterior member that constitutes appearance of the musical instrument. The switcher switches appearance of the touch panel between a first mode and a second mode in which the appearance of the touch panel is closer to appearance of the exterior member than in the first mode.

12 Claims, 15 Drawing Sheets

(56) References Cited

U.S. PATENT DOCUMENTS

| | | | | |
|---|---|---|---|---|
| 2007/0017349 A1* | 1/2007 | Uehara | ................ | G10H 1/0008 |
| | | | | 84/609 |
| 2013/0327200 A1* | 12/2013 | Pogoda | ................ | G10H 1/0008 |
| | | | | 84/626 |
| 2017/0293506 A1* | 10/2017 | Lunsford | ................ | H04L 67/38 |
| 2017/0322618 A1* | 11/2017 | Ahn | .................. | H02J 13/00004 |

FOREIGN PATENT DOCUMENTS

| | | | |
|---|---|---|---|
| JP | 2004139489 | A | 5/2004 |
| JP | 2004212717 | A | 7/2004 |
| JP | 2005284809 | A | 10/2005 |
| JP | 2006146701 | A | 6/2006 |
| JP | 4195695 | B2 | 12/2008 |
| JP | 2012190185 | A | 10/2012 |

\* cited by examiner

FIG. 9

| OPERATION AND STATE WITH RESPECT TO CLP | PLAYER'S SEATED POSITION | | | AUDIENCE STANDING POSITION | | |
|---|---|---|---|---|---|---|
| | LEFTWARD | CENTER | RIGHTWARD | NEAR PANEL | NEAR CENTER OF MUSICAL INSTRUMENT | NEAR RIGHT SIDE OF MUSICAL INSTRUMENT |
| POWER OFF STATE | BLACK | BLACK | BLACK | BLACK | BLACK | BLACK |
| WHEN POWER ON IS DETECTED | CHARACTER | BLACK | BLACK | CHARACTER | BLACK | BLACK |
| PREDETERMINED PERIOD OF TIME HAS ELAPSED AFTER POWER ON | BLACK | BLACK | BLACK | BLACK | BLACK | BLACK |
| WHEN DEPRESSION OF KEY OF KEYBOARD IS DETECTED (DURING MUSICAL PERFORMANCE) | BLACK | BLACK | BLACK | BLACK | BLACK | BLACK |
| WHEN PANEL OPERATION IS DETECTED | CHARACTER | BLACK | BLACK | CHARACTER | BLACK | BLACK |
| PREDETERMINED PERIOD OF TIME HAS NOT ELAPSED SINCE PANEL OPERATION | CHARACTER | BLACK | BLACK | CHARACTER | BLACK | BLACK |
| PREDETERMINED PERIOD OF TIME HAS ELAPSED SINCE PANEL OPERATION | BLACK | BLACK | BLACK | BLACK | BLACK | BLACK |

F I G. 1 5
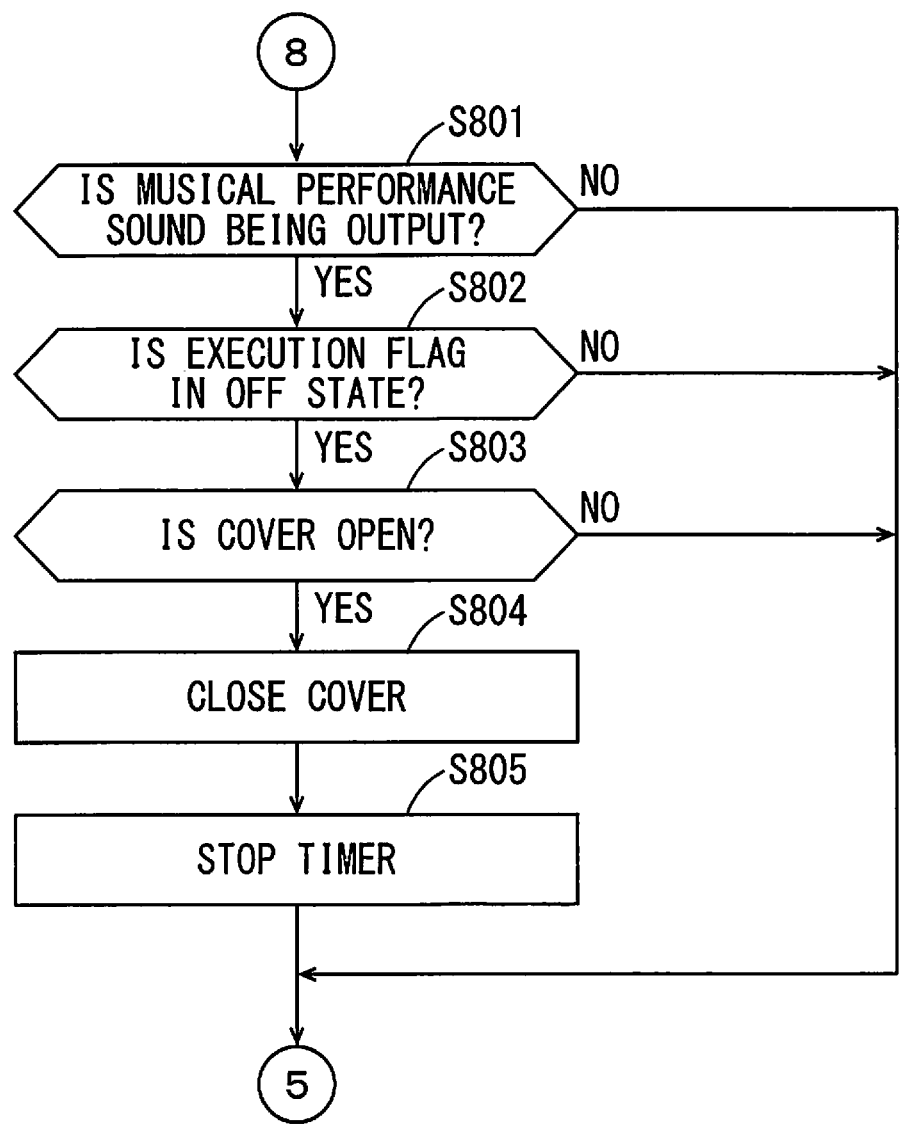

DISPLAY DEVICE FOR MUSICAL INSTRUMENT AND DISPLAY SWITCHING METHOD OF DISPLAY DEVICE FOR MUSICAL INSTRUMENT

BACKGROUND

Technical Field

The present disclosure relates to a display device for a musical instrument that displays setting information of the musical instrument, etc. and a display switching method of the display device for a musical instrument.

Description of Related Art

An electronic musical instrument such as an electronic organ has an operation panel in which operation buttons and so on are arranged. The operation panel includes the operation buttons and switches, for example, and can accept various operations with respect to the electronic musical instrument. A player can utilize various functions included in the electronic musical instrument by operating the operation panel.

Further, an operation panel of an electronic appliance, etc. may be a touch panel type, and operation buttons and contents of current settings are displayed on a touch panel. JP 2006-146701 A discloses an operation input device included in a portable musical player. This portable music player includes a touch panel operation unit, thereby being able to accept an operation with respect to the portable music player.

SUMMARY

As described above, the electronic musical instrument such as an electronic organ has an operation panel, thereby being able to accept an operation performed by a player and execute various functions. For example, the electronic organ has various functions that are not present in an acoustic piano. Meanwhile, there are many players who are drawn to traditional design or traditional appearance of a musical instrument such as an acoustic piano. If excellent functions of an electronic musical instrument and visually pleasing appearance of a traditional musical instrument can both be provided, a player is expected to feel rich and be able to enjoy a function of the electronic musical instrument.

An object of the present disclosure is to provide a display device for a musical instrument that can provide both of functions of an electronic musical instrument and visually pleasing appearance of a traditional musical instrument.

A display device for a musical instrument according to one aspect of the present disclosure includes a touch panel placed to be adjacent to an exterior member that constitutes appearance of the musical instrument and a switcher that switches appearance of the touch panel between a first mode and a second mode in which the appearance of the touch panel is closer to appearance of the exterior member than in the first mode.

Other features, elements, characteristics, and advantages of the present disclosure will become more apparent from the following description of preferred embodiments of the present disclosure with reference to the attached drawings.

BRIEF DESCRIPTION OF THE DRAWING

FIG. 9 is a diagram showing a display state of a display device for a musical instrument according to a second embodiment;

FIG. 15 is a flowchart showing the cover opening closing method according to the third and fourth embodiments.

DETAILED DESCRIPTION

[1] First Embodiment (1) Configuration of Electronic Musical Instrument

Figure 1:
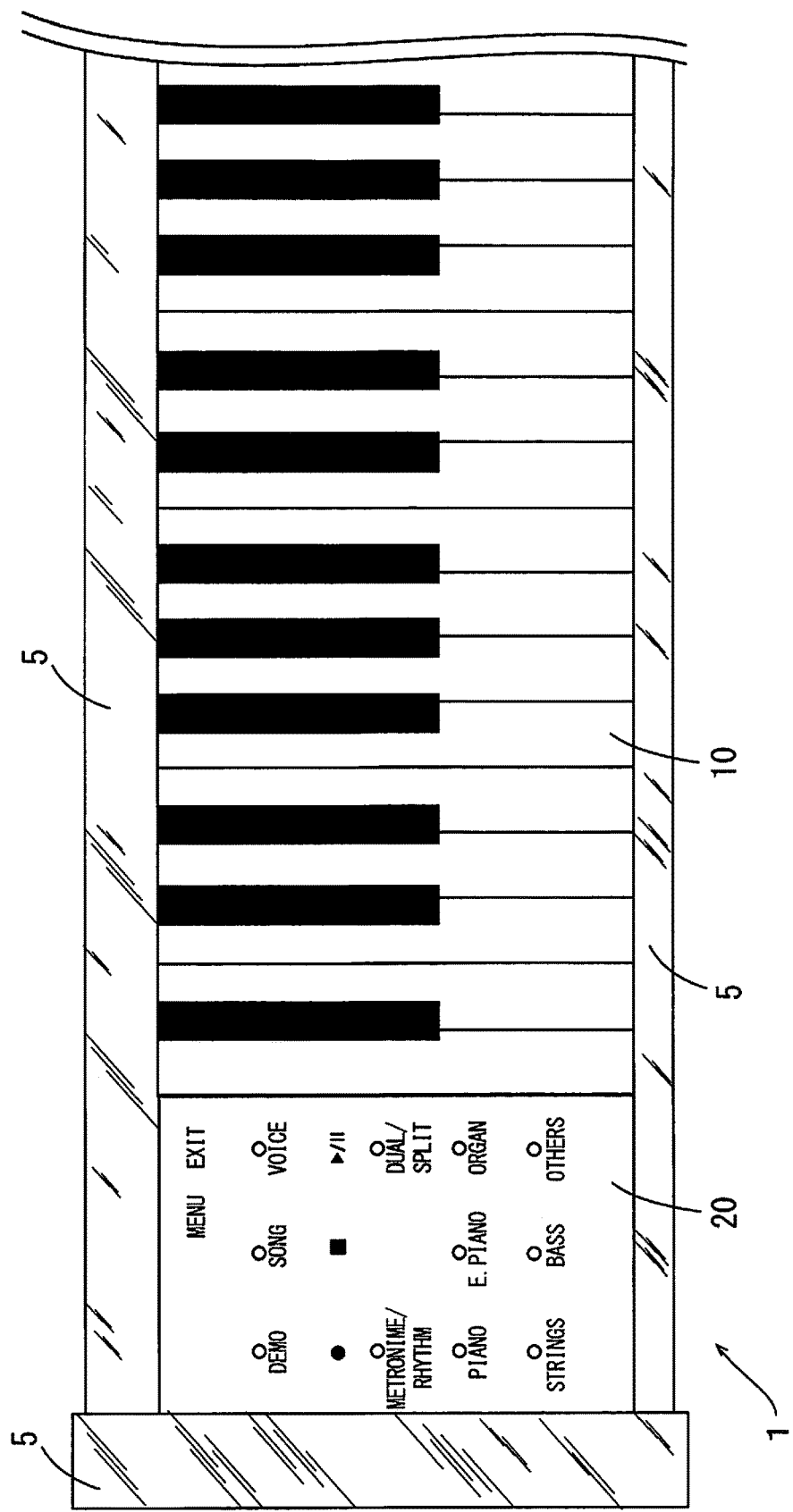
FIG. 1 is a diagram showing the appearance of an electronic musical instrument.

A display device for a musical instrument according to a first embodiment of the present disclosure will be described below in detail with reference to the drawings. FIG. 1 is a diagram showing the appearance of an electronic musical instrument 1 according to the embodiment. The electronic musical instrument 1 is an electronic organ in the present embodiment. The electronic musical instrument 1 includes a keyboard 10 and a touch panel 20. The appearance of the electronic musical instrument 1 is constituted by an exterior member 5 in the vicinity of the keyboard 10 and the touch panel 20. The exterior member 5 is in a calming color such as dark brown or black. Alternatively, a member in a bright color such as white may be used for the exterior member 5. Further, the exterior member 5 is a member having a wood pattern, for example. The touch panel 20 is placed to be adjacent to the exterior member 5.

The touch panel 20 displays operation buttons for performing various setting operations with respect to the electronic musical instrument 1. The touch panel 20 also displays information such as a working function or a working mode in the electronic musical instrument 1. The touch panel 20 is positioned sidewardly of the keyboard 10. That is, the touch panel 20 is placed at a position corresponding to a cheek block (or "hyoshigi" in Japanese) in case of an acoustic piano. In FIG. 1, the touch panel 20 displays various information, and a player or a person near the electronic musical instrument 1 can input an operation with respect to the electronic musical instrument 1 or check a working state of the electronic musical instrument 1, etc. The state shown in FIG. 1 where the touch panel 20 is lit and displays various information is referred to as a first mode.

Figure 2:
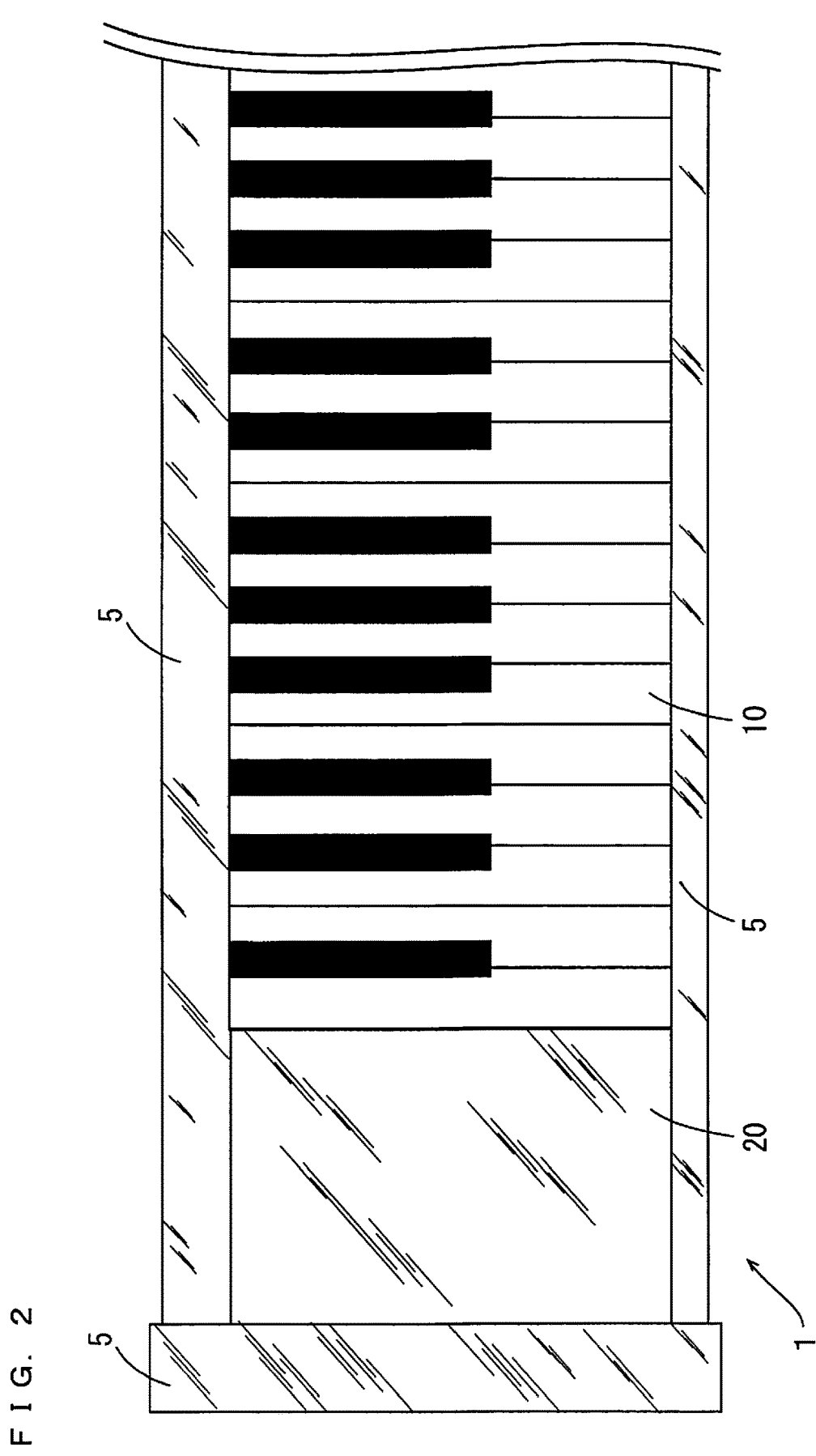
FIG. 2 is a diagram showing the appearance of the electronic musical instrument.

FIG. 2 is a diagram showing the appearance of the electronic musical instrument 1 with the touch panel 20 not displaying the information. In the touch panel 20, a back light is unlit, and the appearance of the touch panel 20 is changed to the appearance resembling the exterior member 5. That is, the information is not displayed in the touch panel 20, and the touch panel 20 appears to be similar to a cheek block of an acoustic piano. The state shown in FIG. 2 where the touch panel 20 is unlit and does not display the information is referred to as a second mode. The appearance of the touch panel 20 in the second mode resembles the appearance of the exterior member 5 as compared to the appearance of the touch panel 20 in the first mode.

The following examples are mentioned as a case where the appearance of the touch panel 20 in the second mode resembles the appearance of the exterior member 5 as compared to the appearance of the touch panel 20 in the first mode. In one example, as shown in FIGS. 1 and 2, the information is displayed in the first mode, and the information is not displayed in the second mode. Alternatively, the size of a field for displaying the information may be reduced for the second mode as compared to the first mode. In another example, the degree to which the color of the touch panel 20 blends in with the color of the exterior member 5 in the second mode is higher than the degree to which the color of the touch panel 20 blends in with the color of the exterior member 5 in the first mode. In other words, the degree of correlation between the color of the touch panel 20 and the color of the exterior member 5 in the second mode is higher than the degree of correlation between the color of the touch panel 20 and the color of the exterior member 5 in the first mode. Further, in yet another example, the degree to which the pattern of the touch panel 20 blends in with the pattern of the exterior member 5 in the second mode is higher than the degree to which the pattern of the touch panel 20 blends in with the pattern of the exterior member 5 in the first mode. In other words, the degree of correlation between the pattern of the touch panel 20 and the pattern of the exterior member 5 in the second mode is higher than the degree of correlation between the pattern of the touch panel 20 and the pattern of the exterior member 5 in the first mode. For example, it is considered that the touch panel 20 is displayed to have a wood pattern in the second mode in a case where the exterior member 5 has a wood pattern.

(2) Configuration of Touch Panel

Figure 3:
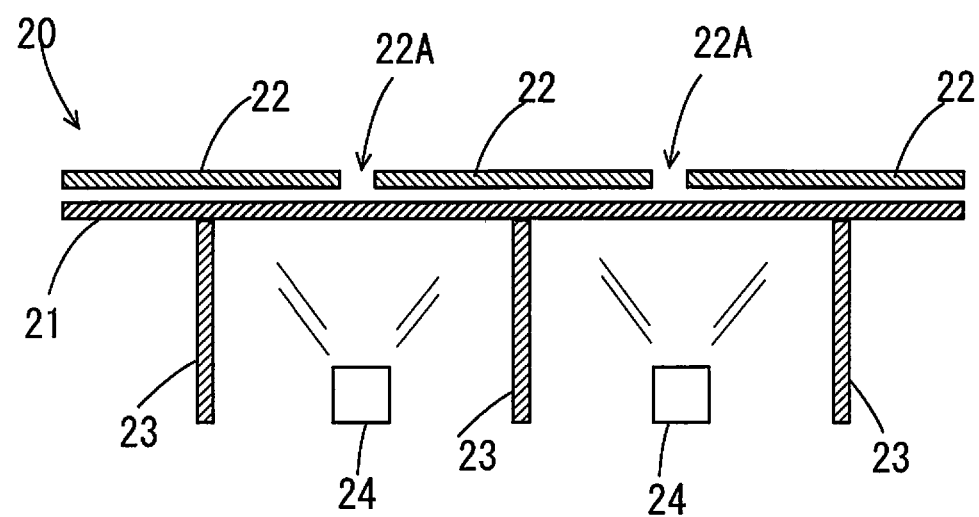
FIG. 3 is a cross sectional side view of a touch panel.

FIG. 3 is a cross sectional side view of the touch panel 20. While the touch panel 20 is a resistive film type in the present embodiment by way of example, the touch panel 20 may be a capacitance type. As shown in FIG. 3, in the touch panel 20, a film 22 is placed above an LCD glass laminate 21. The film 22 is a black film, for example, and open portions 22A are formed in the film 22 by cutting off characters, symbols, etc. In a lower portion of the LCD glass laminate 21, a plurality of ribs 23 are provided, and LEDs 24 for backlights are placed in spaces separated by the ribs 23.

Since having such a configuration, the touch panel 20 can present characters and symbols formed by the open portions 22A as information by turning the light on of the LEDs 24. Further, the characters, symbols, etc. formed by the open portions 22A are separated by the ribs 23. Therefore, when part of the LEDs 24 is lit, the light from the LED 24 does not leak to the characters, symbols, etc. formed by adjacent open portions 22A, so that only the character or symbol corresponding to the lit LED 24 can be displayed clearly.

The film 22 is a black film as described above. The film 22 may also be in dark brown or have a wood pattern. Alternatively, the film 22 may be in a bright color such as white. The film 22 is preferably in a color resembling the exterior member 5. Alternatively, the film 22 preferably has a pattern resembling the exterior member 5. When the touch panel 20 is unlit because the LED 24 is unlit, the appearance of the film 22 becomes the appearance of the touch panel 20.

(3) Functional Configuration of Electronic Musical Instrument

Figure 4:
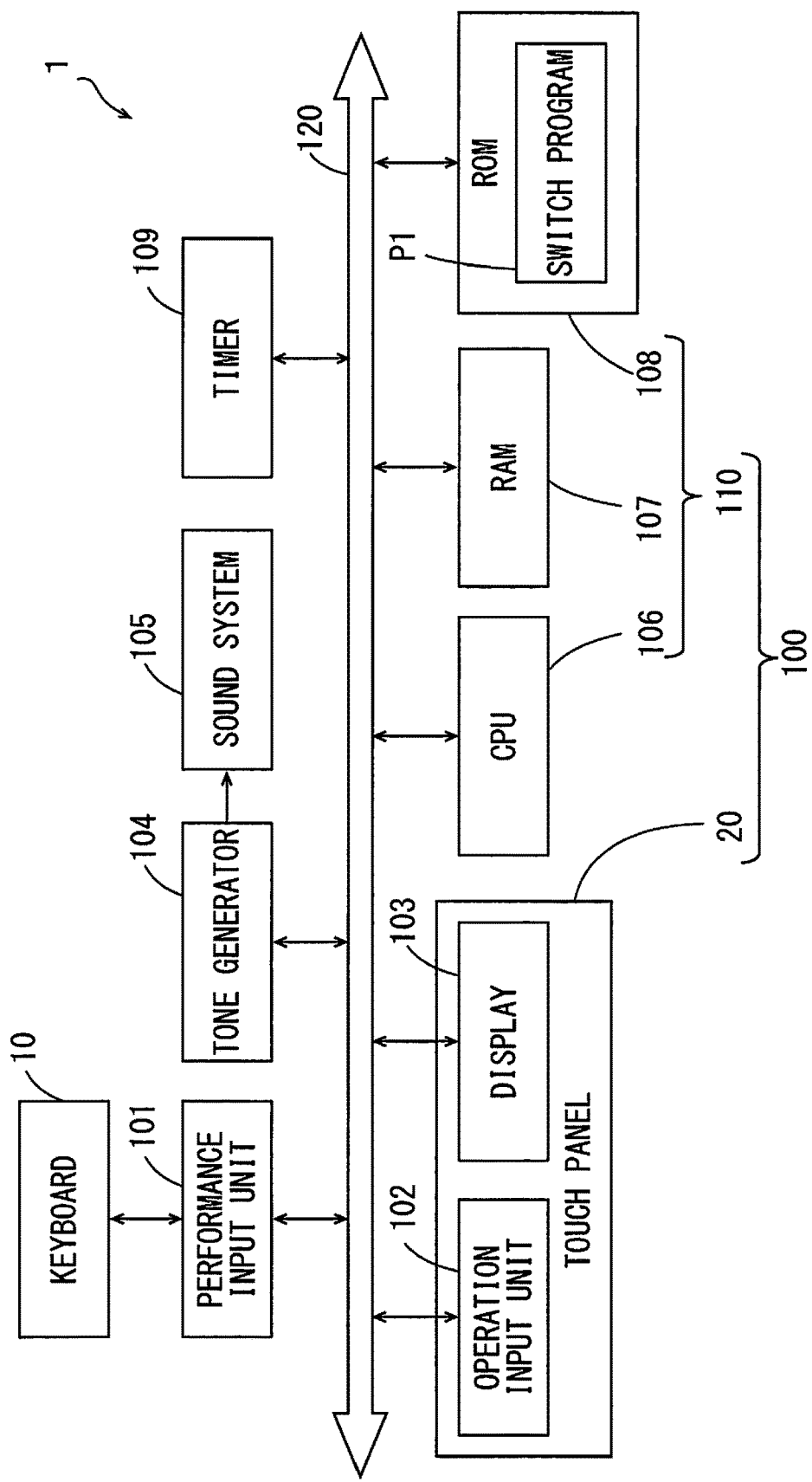
FIG. 4 is a block diagram showing the configuration of the electronic musical instrument.

Next, the functional configuration of the electronic musical instrument 1 will be described. FIG. 4 is a block diagram showing the functional configuration of the electronic musical instrument 1. The electronic musical instrument 1 includes the keyboard 10, the touch panel 20, a performance input unit 101, a tone generator 104, a sound system 105, a CPU (Central Processing Unit) 106, a RAM (Random Access Memory) 107, a ROM (Read Only Memory) 108 and a timer 109. The touch panel 20 includes an operation input unit 102 and a display 103.

The performance input unit 101 receives musical performance operation information from the keyboard 10. The performance input unit 101 outputs musical performance data representing the contents of a musical performance based on the musical performance operation information. The musical performance data is made of MIDI (Musical Instrument Digital Interface) data or audio data. The operation input unit 102 receives operations for adjustment of a musical performance sound, selection of an automatic accompaniment sound, adjustment of the volume of an automatic accompaniment sound, reproduction of a musical performance demonstration sound, on-off of a power supply and various settings. The display 103 displays various information relating to a musical performance or settings, for example. The touch panel 20 is constituted by the operation input unit 102 and the display 103. The performance input unit 101, the operation input unit 102 and the display 103 are connected to a bus 120.

The RAM 107 is made of a volatile memory, for example, and is used as a work area when the CPU 106 executes a program and temporarily stores various data. The ROM 108 is made of a non-volatile memory, for example, and stores a computer program such as a switch program P1 and various data. A flash memory such as EEPROM is used as the ROM 108. The CPU 106 executes the switch program P1 stored in the ROM 108 while utilizing the RAM 107 as a work area, thereby performing a display switching method, described below. The CPU 106, the RAM 107 and the ROM 108 are connected to the bus 120. The CPU 106, the RAM 107 and the ROM 108 constitute a switcher 110. The touch panel 20 and the switcher 110 constitute the display device 100 for a musical instrument.

The tone generator 104 is connected to the bus 120, and the sound system 105 is connected to the tone generator 104. The tone generator 104 generates a musical sound signal based on the musical performance data received from the performance input unit 101. The sound system 105 includes a digital-analogue (D/A) conversion circuit, an amplifier and a speaker. The sound system 105 converts the musical sound signal supplied from the tone generator 104 into an analogue sound signal and generates a sound based on the analogue sound signal. Thus, the musical sound signal is reproduced. The timer 109 is connected to the bus 120 and measures an elapsed period of time in response to an instruction provided by the switcher 110.

(4) Display Switching Method

FIGS. 5 to 8 are flowcharts showing the display switching method according to the first embodiment. The display switching method of FIGS. 5 to 8 is performed by the switcher 110 shown in FIG. 4. First, reference is made to FIG. 5. In the step S101, the switcher 110 determines whether an operation of turning on the power is detected in the operation input unit 102. In a case where the operation of turning on the power is detected, the switcher 110 turns on the light of the touch panel 20 (step S102). Then, the switcher 110 starts the timer 109 (step S103). Thus, the timer 109 starts measuring an elapsed period of time for maintenance of a lit state of the touch panel 20.

In a case where the operation of turning on the power is not detected in the step S101, the switcher 110 determines whether an operation of turning off the power has been detected in the operation input unit 102 in the step S104. In a case where the operation of turning off the power has been detected, the switcher 110 turns off the light of the touch panel 20 (step S105). Then, the switcher 110 stops the timer 109 (step S106). Further, the switcher 110 stops work in execution (step S107). For example, reproduction of demonstration of a musical performance or reproduction of an automatic accompaniment sound is stopped.

In a case where the operation of turning off the power is not detected in the step S104, the switcher 110 determines whether the timer 109 is active and whether the elapsed period of time measured by the timer 109 has exceeded a predetermined period of time (step S108). In a case where the predetermined period of time has elapsed, the switcher 110 turns off the light of the touch panel 20 (step S109). Then, the switcher 110 stops the timer 109 (step S110). In the step S109, in a case where the timer 109 is not active, or a case where the timer is active but the predetermined period of time has not elapsed, the process proceeds to the step S201 of FIG. 6. Further, the process returns to the step S101 after the step S103, the step S107 or the step S110.

Figure 6:
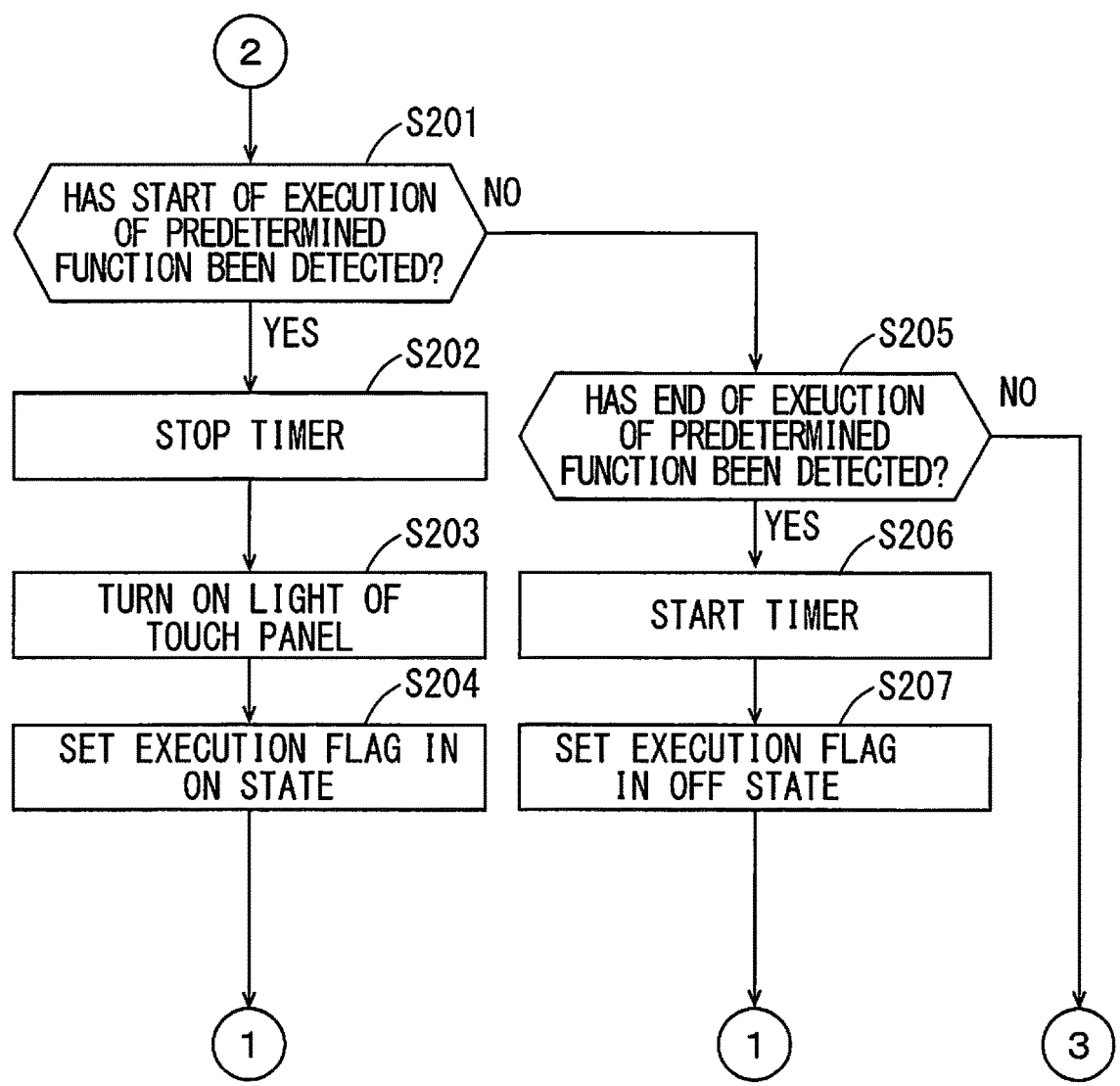
FIG. 6 is a flowchart showing the display switching method according to the first embodiment.

Next, reference is made to FIG. 6. In the step S201, the switcher 110 determines whether a start of execution of a predetermined function has been detected. The predetermined function is a function that is to be executed with the touch panel 20 lit at all times. For example, reproduction of demonstration of a musical performance, recording, etc. are set as the predetermined function. In a case where a start of execution of a predetermined function has been detected, the switcher 110 stops the timer 109 (step S202). Then, the switcher 110 turns on the light of the touch panel 20 (step S203). Further, the switcher 110 sets an execution flag indicating execution of a predetermined function in an ON state (step S204).

In the step S201, in a case where a start of execution of a predetermined function has not been detected, the switcher 110 determines whether an end of execution of a predetermined function has been detected (step S205). In a case where an end of execution of a predetermined function has been detected, the switcher 110 starts the timer 109 (step S206). That is, since execution of a predetermined function has ended, the timer 109 is started such that the touch panel 20 is unlit after a predetermined period of time elapses from the end of execution of the predetermined function. Further, the switcher 110 sets the execution flag indicating execution of a predetermined function in an OFF state (step S207). In a case where an end of execution of a predetermined function has not been detected in the step S205, the process proceeds to the step S301 of FIG. 7. Further, the process returns to the step S101 after the step S204 or the step S207.

Figure 7:
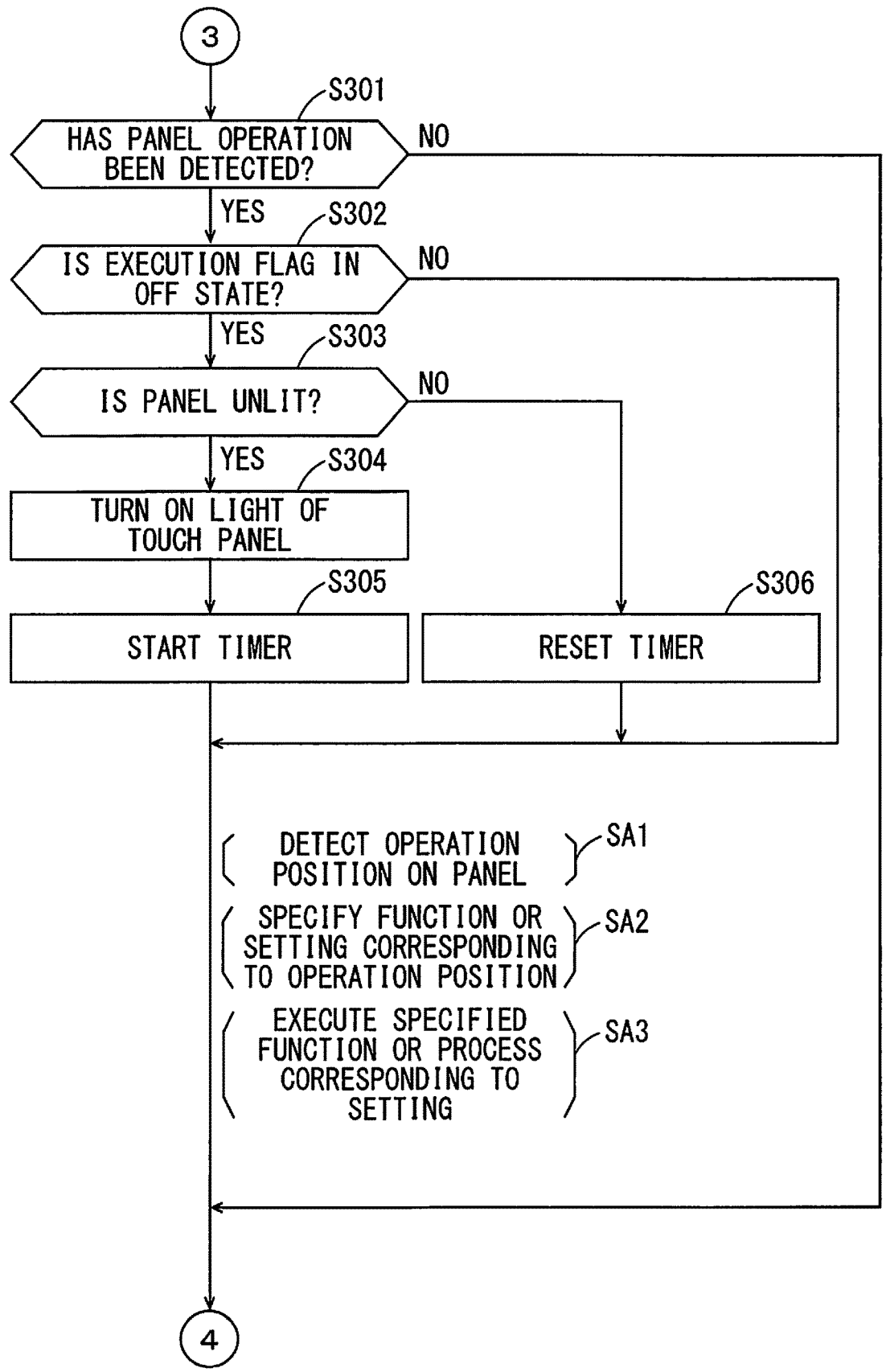
FIG. 7 is a flowchart showing the display switching method according to the first embodiment.

Next, reference is made to FIG. 7. In the step S301, the switcher 110 determines whether a panel operation with respect to the touch panel 20 has been detected. That is, the switcher 110 determines whether input of an operation with respect to the operation input unit 102 has been detected. In a case where a panel operation is detected, the switcher 110 determines whether an execution flag of a predetermined function is in an OFF state (step S302). In a case where the execution flag is in the OFF state, the switcher 110 determines whether the touch panel 20 is unlit (step S303). In a case where the touch panel 20 is unlit, the switcher 110 turns on the light of the touch panel 20 (step S304). That is, in a case where a panel operation is performed with the execution flag in the OFF state, if the touch panel 20 is unlit, the light of the touch panel 20 is turned on. Then, the switcher 110 starts the timer 109 (step S305). Thus, measurement of the predetermined period of time from a point in time at which the light of the touch panel 20 is turned on is started. In a case where it is determined that the touch panel 20 is lit in the step S303, the switcher 110 resets the timer 109 (step S306). That is, although the touch panel 20 is lit, because a panel operation is newly performed, measurement of a predetermined period of time is reset (measurement starts from 0).

Figure 8:
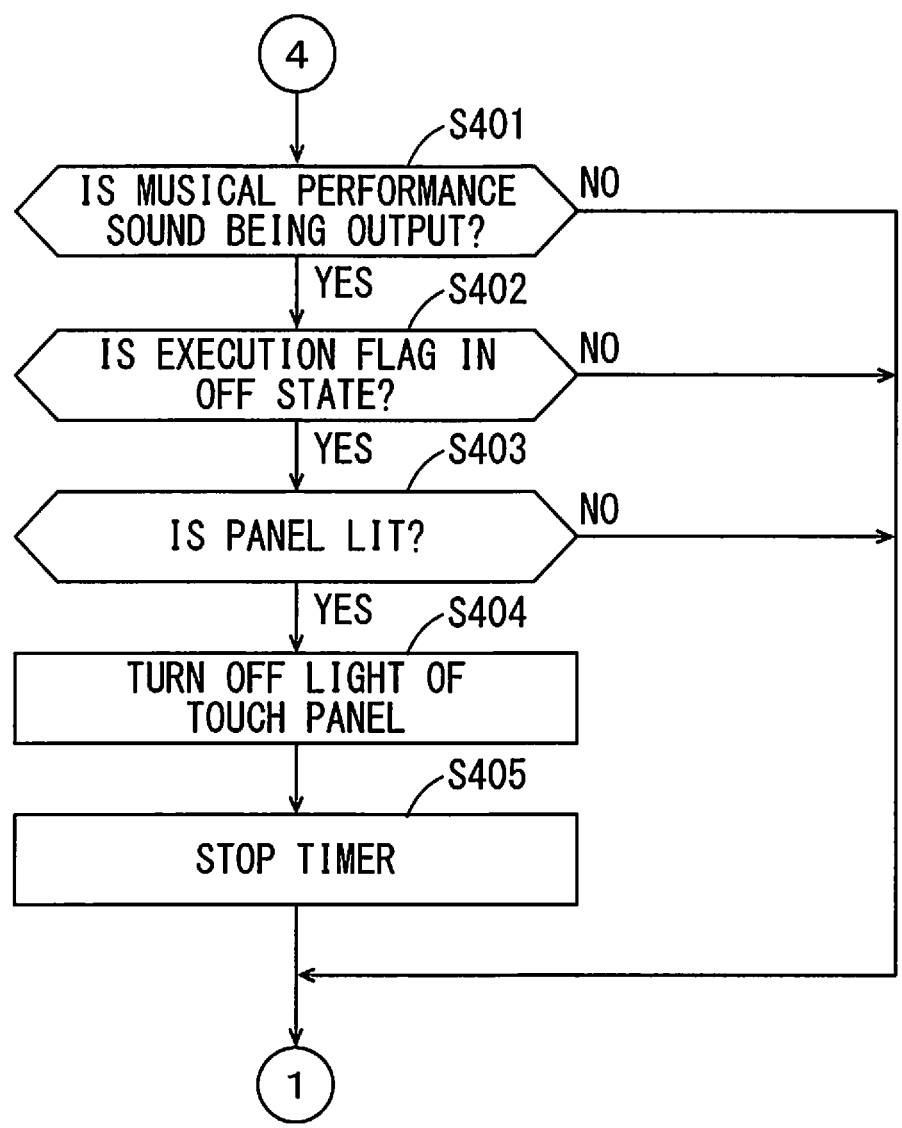
FIG. 8 is a flowchart showing the display switching method according to the first embodiment.

After the measurement of the predetermined period of time is started in the step S305 and the step S306, the process executed by the switcher 110 proceeds to the step S401 of FIG. 8. Further, in a case where a panel operation has not been detected in the step S301, the process proceeds to the step S401 of FIG. 8. Further, the CPU 106 executes the process of the step SA1 to the step SA3 after the step S305 and the step S306 performed by the switcher 110. First, the CPU 106 detects an operation position with respect to the touch panel 20 (step SA1). Subsequently, the CPU 106 specifies a function or a setting corresponding to the operation position (step SA2). Then, in a case where the specified function is executable, the CPU 106 executes the specified function. Alternatively, in a case where the specified setting is settable, the CPU 106 makes the specified setting (step SA3).

Next, reference is made to FIG. 8. In the step S401, the switcher 110 determines whether a musical performance sound is being output. The switcher 110 determines the output state of a musical performance sound based on whether the performance input unit 101 is receiving musical performance operation information. In a case where a musical performance sound is being output, the switcher 110 determines whether an execution flag of a predetermined function is in an OFF state (step S402). In a case where the execution flag is in the OFF state, the switcher 110 determines whether the touch panel 20 is lit (step S403). In a case where the touch panel 20 is lit, the switcher 110 turns off the light of the touch panel 20 (step S404). That is, in a case where a musical performance sound is output with the execution flag in the OFF state, the light of the touch panel 20 is turned off. Then, the switcher 110 stops the timer 109 (step S405). After the step S405, the process returns to the step S101 of FIG. 5. In a case where a musical performance sound is not being output in the step S401, a case where the execution flag is in an ON state in the step S402 or a case where it is determined in the step S403 that the touch panel 20 is unlit, the process returns to the step S101 of FIG. 5.

(5) Effects of First Embodiment

As described above, the display device 100 for a musical instrument according to the present embodiment includes the touch panel 20 placed to be adjacent to the exterior member 5 that constitutes the appearance of the electronic musical instrument 1. Then, the switcher 110 included in the display device 100 for a musical instrument switches the appearance of the touch panel 20 between the first mode and the second mode in which the appearance of the touch panel 20 is closer to that of the exterior member 5 than in the first mode. Thus, in the second mode, the touch panel 20 has a visually pleasing appearance in which the touch panel 20 blends into the exterior member 5 of the electronic musical instrument 1. The player can operate the electronic musical instrument 1 while having a feeling similar to the feeling of playing an acoustic piano.

Further, as shown in the step S301 to the step S306 of FIG. 7, the switcher 110 switches the appearance of the touch panel 20 from the second mode to the first mode when detecting an operation with respect to the touch panel 20. Because the touch panel 20 is lit when the player performs an operation on the touch panel 20, the player can easily perform an operation on the touch panel 20.

Further, as shown in the step S201 to the step S207 of FIG. 6, the appearance of the touch panel 20 is switched from the second mode to the first mode during execution of a specific function in the electronic musical instrument 1. The touch panel 20 is lit during execution of a specific function that requires information to be displayed on the touch panel 20. The player can check the execution state of the specific function on the touch panel 20.

Figure 5:
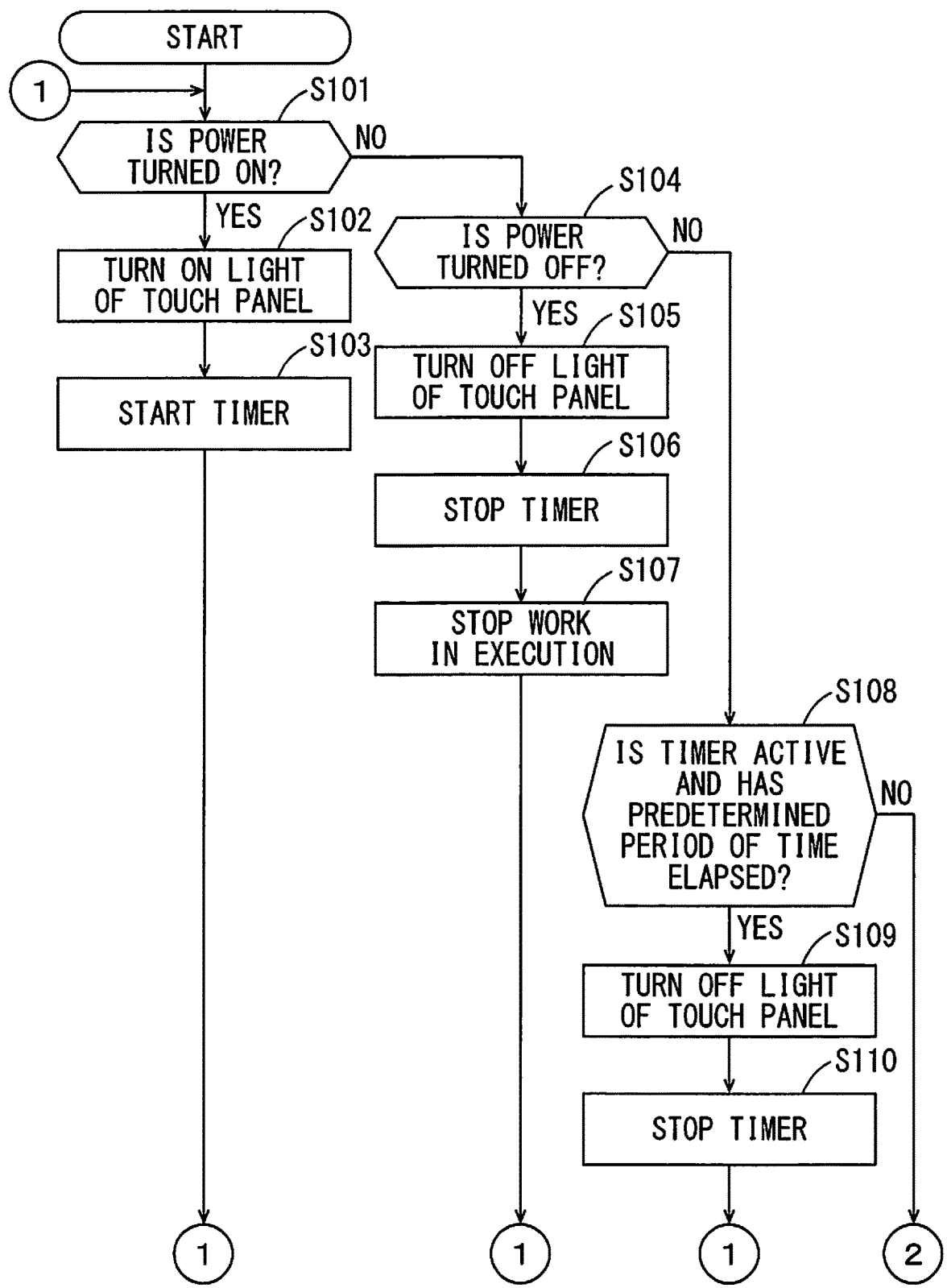
FIG. 5 is a flowchart showing a display switching method according to a first embodiment.

Further, as shown in the step S108 to the step S110 of FIG. 5, in a case where an operation performed on the touch panel 20 has not been detected in a predetermined period of time, or a case where the predetermined period of time has elapsed since the end of execution of a specific function, the appearance of the touch panel 20 is switched from the first mode to the second mode. When the player does not need to perform an operation on the touch panel 20, or when a specific function is not being executed, the appearance of the touch panel 20 becomes close to the exterior member 5 of the electronic musical instrument 1. The player can operate the electronic musical instrument 1 having a visually pleasing appearance while having a feeling similar to the feeling of playing an acoustic piano.

Further, as shown in the step S401 to the step S405 of FIG. 8, the switcher 110 switches the appearance of the touch panel 20 from the first mode to the second mode during the output of a musical performance sound in the electronic musical instrument 1. Because the appearance of the touch panel 20 is similar to the appearance of the exterior member 5 during a musical performance, the player can enjoy a musical performance while having a feeling similar to the feeling of playing an acoustic piano.

Further, the switcher 110 turns on the light of the touch panel 20 in the first mode and turns off the light of the touch panel 20 in the second mode. In this manner, it is possible to change the appearance of the touch panel 20 to be close to the exterior member 5 by changing the lighting mode of the touch panel 20.

Further, in the first mode, the touch panel 20 of the electronic musical instrument 1 displays the information to be viewable for an information presentation subject. Here, the information presentation subject is the player who plays the electronic musical instrument 1 or an audience who listens to a musical performance sound of the electronic musical instrument 1. In this manner, the touch panel 20 presents the information to the information presentation subject in the first mode, and is switched to have the appearance close to the exterior member 5 in the second mode.

[2] Second Embodiment (1) Switching Display by Polarizer

Next, a display device 100 for a musical instrument according to a second embodiment of the present disclosure will be described. In the display device 100 for a musical instrument according to the second embodiment, the touch panel 20 includes a polarizer. The configuration of the rest of the display device 100 for a musical instrument is similar to that of the first embodiment.

FIG. 9 is a diagram showing the state of appearance of the touch panel 20 according to the second embodiment. The touch panel 20 according to the second embodiment includes the polarizer, whereby the state of appearance changes depending on a position of an observer who views the touch panel 20. In FIG. 9, "black" indicates that the touch panel 20 appears close to the appearance of the exterior member 5 for the observer, that is, the touch panel 20 is in the second mode. In FIG. 9, "character" indicates that the touch panel 20 displays information to be viewable for the observer, that is, the touch panel 20 is in the first mode.

In the example of FIG. 9, in a case where the player is seated at a leftward position, and an audience stands near the touch panel 20, the state of appearance of the touch panel 20 is similar to that of the first embodiment. That is, the appearance of the touch panel 20 is in the second mode for the observer, when the power is turned off, after a predetermined period has elapsed since the power is turned on, during a musical performance or after a predetermined period has elapsed since a panel operation is performed. Further, the appearance of the touch panel 20 is in the first mode for the observer, when turning on of the power is detected, when a panel operation is detected or in a case where a predetermined period has not elapsed since a panel operation is performed.

In contrast, in a case where the player is seated near the center or at a rightward position, and an audience stands near the center or near the right side of the electronic musical instrument 1, the appearance of the touch panel 20 is in the second mode for the observer due to the effect of the polarizer. The observer can play the electronic musical instrument 1 or listen to and watch a musical performance of the electronic musical instrument 1 while having a feeling similar to the feeling of observing an acoustic piano.

(2) Effects of Second Embodiment

As described above, in the display device 100 for a musical instrument of the second embodiment, the touch panel 20 includes the polarizer, so that the touch panel 20 can be in the second mode at all times depending on the position of the observer. In the example shown in FIG. 9, during a period in which the player is giving a musical performance while being seated near the center or at the rightward position, the touch panel 20 can be in the second mode at all times in display device 100 for a musical instrument. Further, in the example shown in FIG. 9, during a period in which the audience stands near the center or near the right side of the electronic musical instrument 1, the touch panel 20 can be in the second mode at all times in the display device 100 for a musical instrument.

Figure 10A:
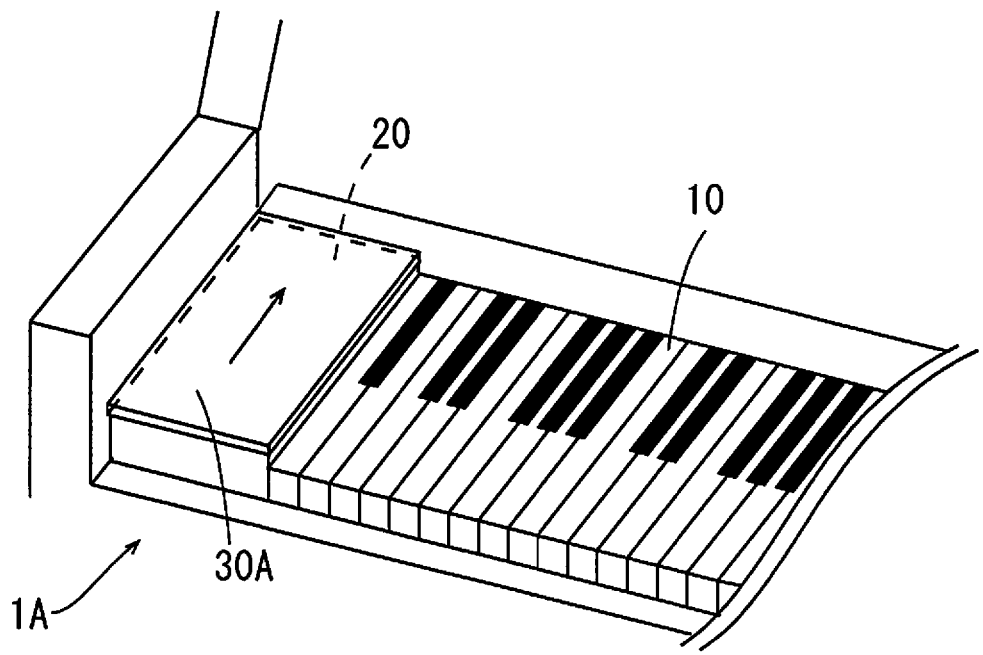
FIGS. 10A and 10B are diagrams showing the appearance of an electronic musical instrument according to a third embodiment.
Figure 10B:
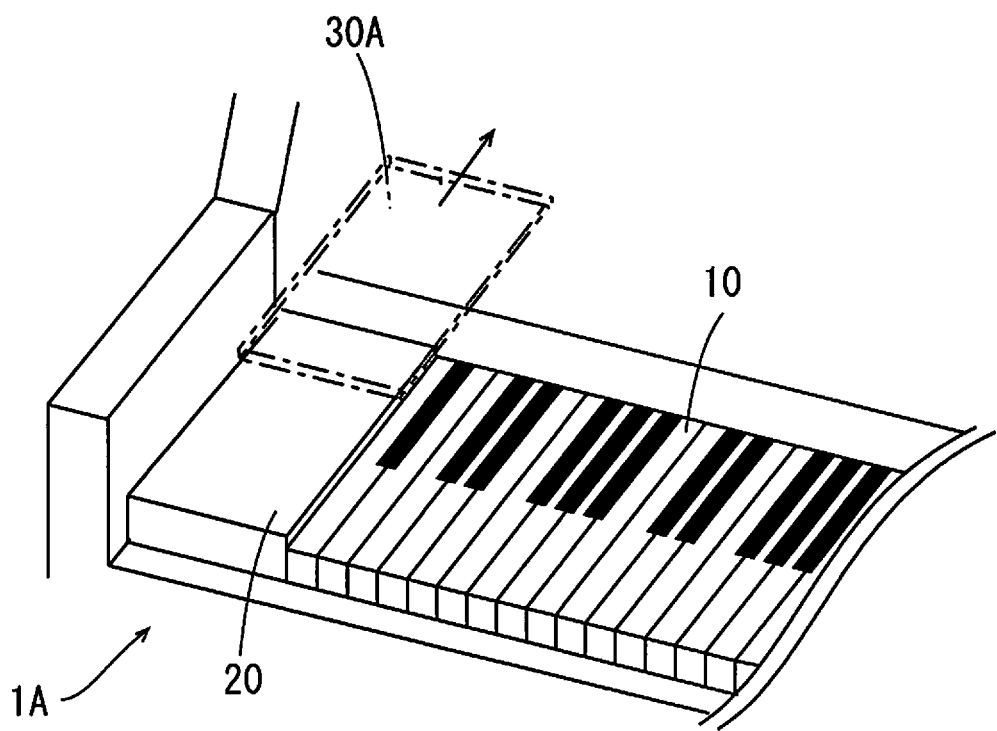
Figure 11A:
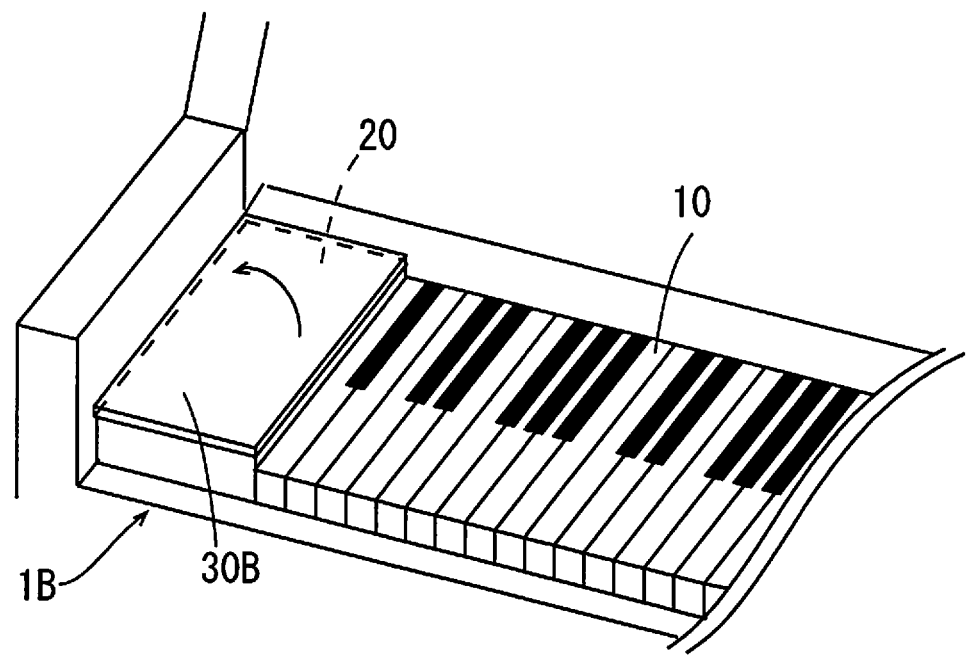
FIGS. 11A and 11B are diagrams showing the appearance of an electronic musical instrument according to a fourth embodiment.
Figure 11B:
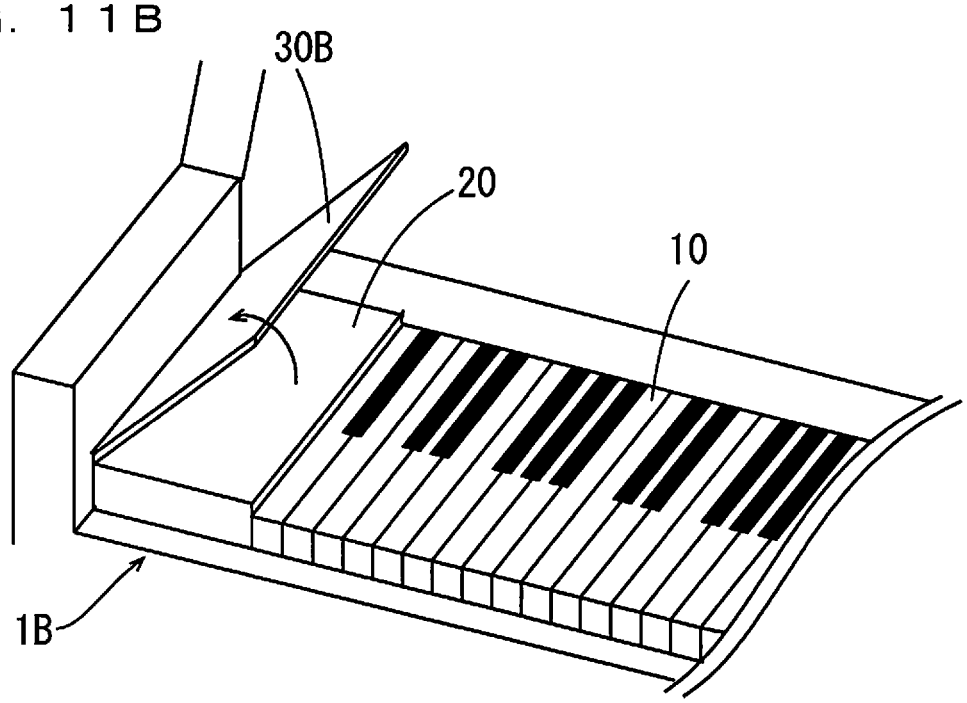
Figure 12:
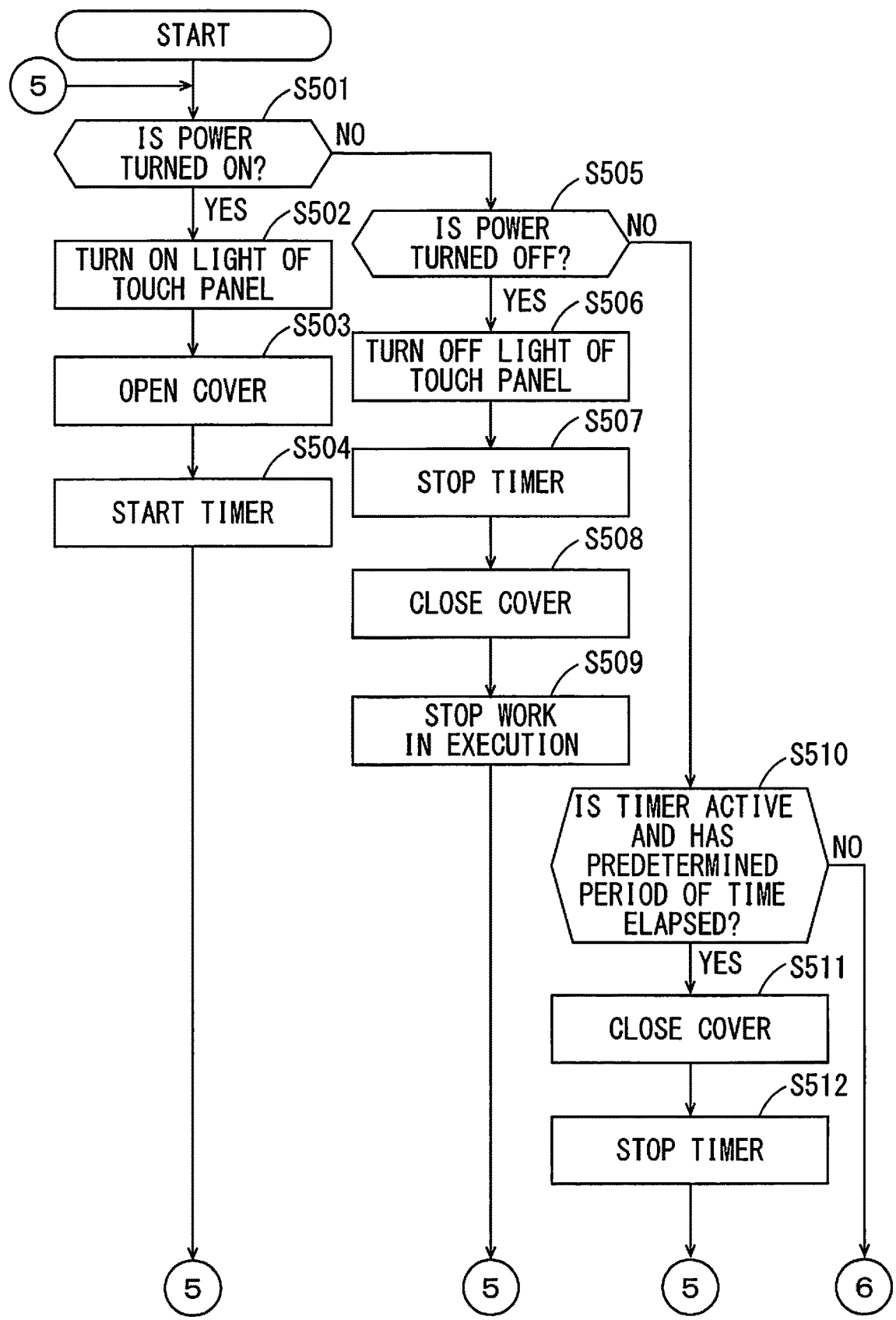
FIG. 12 is a flowchart showing a cover opening closing method according to the third and fourth embodiments.

[3] Third and Fourth Embodiments (1) Configuration of Electronic Musical Instrument FIGS. 10A and 10B are diagrams showing the appearance of an electronic musical instrument 1A of a third embodiment. FIGS. 11A and 11B diagrams showing the appearance of an electronic musical instrument 1B of a fourth embodiment. As shown in FIG. 10A, in the electronic musical instrument 1A, a cover 30A is attached to a touch panel 20. In FIG. 10A, the touch panel 20 is covered by the cover 30A. The appearance of the cover 30A is in the second mode and resembles the appearance of an exterior member 5. As shown in FIG. 10B, the cover 30A opens, so that the touch panel 20 is exposed. In the third embodiment, the touch panel 20 is put in the first mode when the cover 30A is opened, and is put in the second mode when the cover 30A is closed.

As shown in FIG. 11A, in the electronic musical instrument 1B of the fourth embodiment, a touch panel 20 is covered by a cover 30B. As shown in FIG. 11B, the cover 30B opens, so that the touch panel 20 is exposed. Also in the fourth embodiment, the touch panel 20 is put in the first mode when the cover 30B is opened, and is put in the second mode when the cover 30B is closed.

The configurations of the electronic musical instruments 1A and 1B of the third and fourth embodiments are also similar to that of the electronic musical instrument 1 of the first embodiment shown in FIG. 4. However, a switcher 110 of the electronic musical instrument 1A or 1B switches the appearance of the touch panel 20 between the first mode and the second mode by opening and closing the cover 30A or 30B.

(2) Cover Opening Closing Method

FIGS. 12 to 15 are flowcharts showing the cover opening closing method according to the third and fourth embodiments. Since the following description applies to both of the third and fourth embodiments, the cover 30A and 30B are collectively referred to as a cover 30. The cover opening closing method of FIGS. 12 to 15 is performed by the switcher 110 shown in FIG. 4. In the step S501 of FIG. 12, the switcher 110 determines whether an operation of turning on the power has been detected. In a case where an operation of turning on the power has been detected, the switcher 110 turns on the light of the touch panel 20 (step S502), opens the cover 30 (step S503) and starts the timer 109 (step S504).

In a case where the operation of turning on the power has not been detected in the step S501, the switcher 110 determines in the step S505 whether the operation of turning off the power has been detected. In a case where the operation of turning off the power has been detected, the switcher 110 turns off the light of the touch panel 20 (step S506) and stops the timer 109 (step S507). Further, the switcher 110 closes the cover 30 (step S508) and stops work in execution (step S509).

In a case where the operation of turning off the power has not been detected in the step S505, the switcher 110 determines whether the timer 109 is active and whether the elapsed period of time measured by the timer 109 has exceeded a predetermined period of time (step S510). In a case where the predetermined period of time has elapsed, the switcher 110 closes the cover 30 (step S511) and stops the timer 109 (step S512). In the step S510, in a case where the timer 109 is not active or a case where the timer is active but the predetermined period of time has not elapsed, the process proceeds to the step S601 of FIG. 13.

Figure 13:
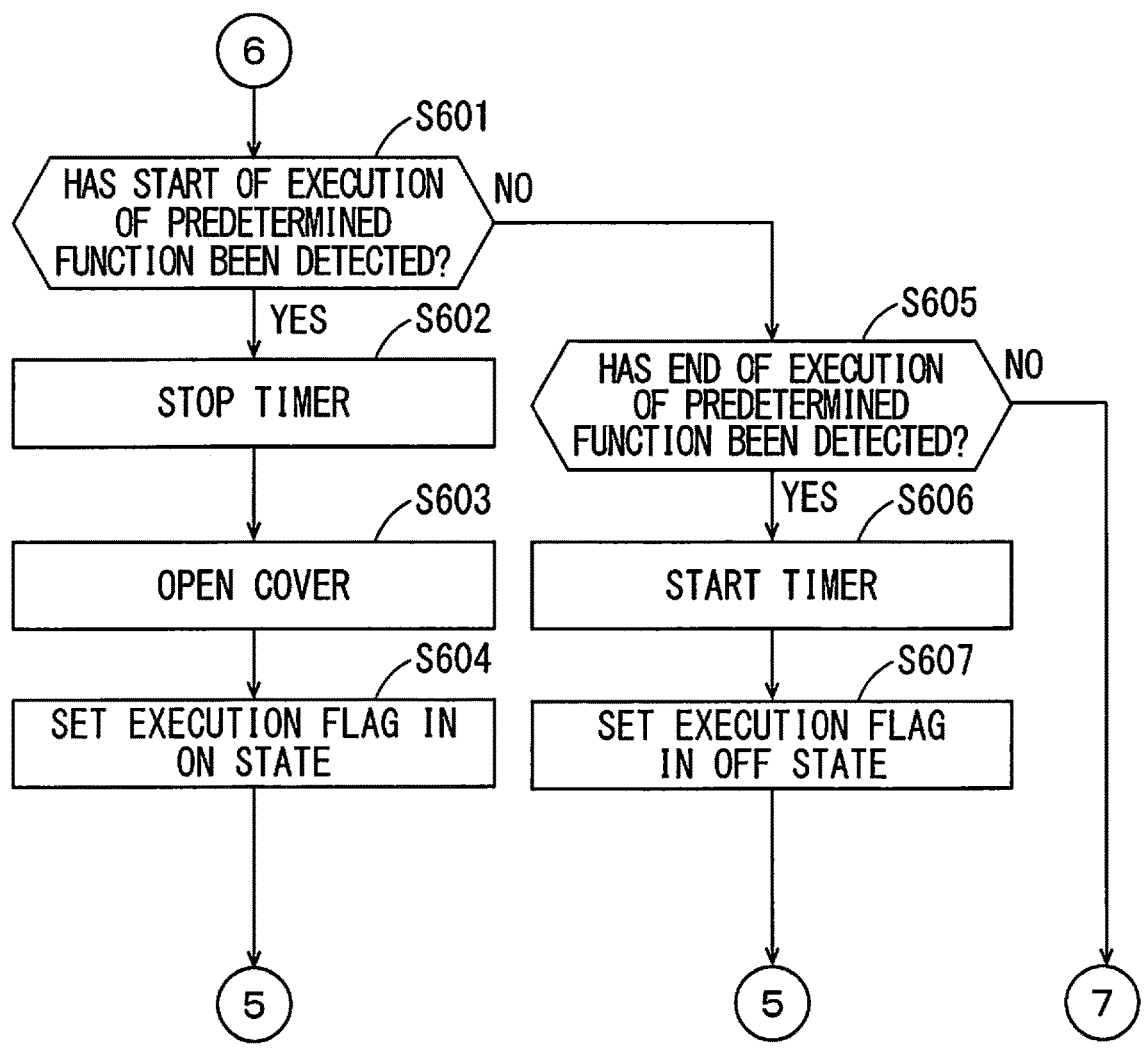
FIG. 13 is a flowchart showing a cover opening closing method according to the third and fourth embodiments.

In the step S601 of FIG. 13, the switcher 110 determines whether a start of execution of a predetermined function has been detected. In a case where a start of execution of a predetermined function has been detected, the switcher 110 stops the timer 109 (step S602). In a case where the cover 30 is closed, the switcher 110 opens the cover (step S603) and sets an execution flag in an ON state (step S604). In the step S601, in a case where a start of execution of a predetermined function has not been detected, the switcher 110 determines whether an end of execution of a predetermined function has been detected (step S605). In a case where an end of execution of a predetermined function has been detected, the switcher 110 starts the timer 109 (step S606) and sets an execution flag in an OFF state (step S607).

Figure 14:
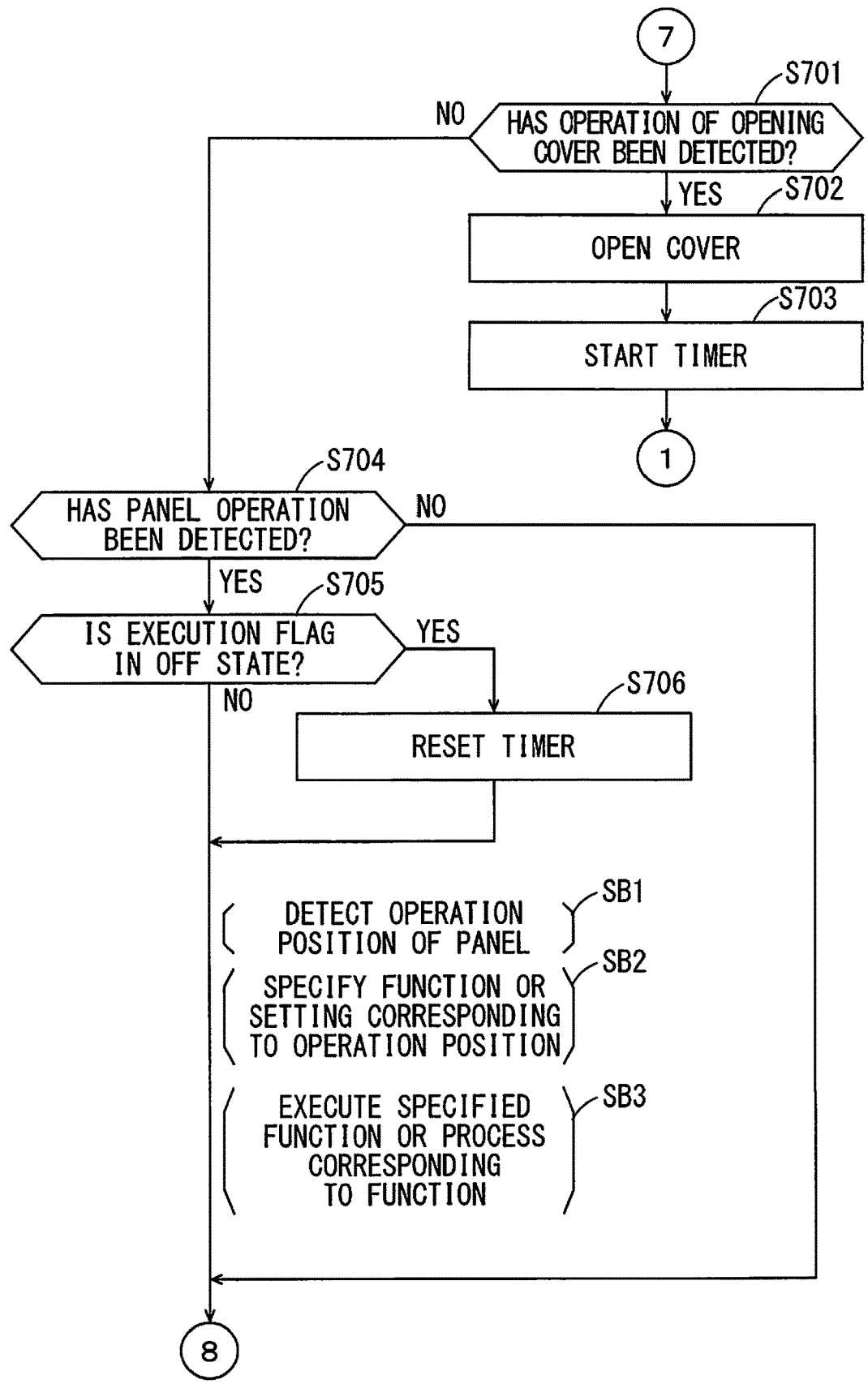
FIG. 14 is a flowchart showing the cover opening closing method according to the third and fourth embodiments.

In the step S605, in a case where an end of execution of a predetermined function has not been detected, the process proceeds to the step S702 of FIG. 14.

In the step S701 of FIG. 14, the switcher 110 determines whether an operation of opening the cover 30 has been detected. In a case where an operation of opening the cover 30 has been detected, the switcher 110 opens the cover 30 (step S702) and starts the timer 109 (step S703). For example, the player depresses a predetermined portion of the cover 30, the switcher 110 detects an opening operation. The cover 30 includes a driver (not shown) and carries out an opening-closing work by the control of the switcher 110. In a case where an operation of opening the cover 30 has not been detected in the step S701, the switcher 110 determines whether a panel operation with respect to the touch panel 20 has been detected (step S704). In a case where a panel operation has been detected, the switcher 110 determines whether an execution flag of a predetermined function is in the OFF state (step S705). In a case where the execution flag is in the OFF state, the switcher 110 resets the timer 109 (step S706). After the step S705 or the step S706, the process executed by the switcher 110 proceeds to the step S801 of FIG. 15. Further, after the step S705 and the step S706 performed by the switcher 110, the CPU 106 detects an operation position with respect to the touch panel 20 (step SB1) and specifies a function or setting corresponding to the operation position (step SB2). Then, in a case where the specified function is executable, the CPU 106 executes the specified function. Alternatively, in a case where the specified setting is settable, the CPU 106 makes the specified setting (step SB3).

In the step S801 of FIG. 15, the switcher 110 determines whether a musical performance sound is being output. In a case where a musical performance sound is being output, the switcher 110 determines whether an execution flag of a predetermined function is in the OFF state (step S802). In a case where the execution flag is in the OFF state, the switcher 110 determines whether the cover 30 is opened (step S803). In a case where the cover 30 is opened, the switcher 110 closes the cover 30 (step S804) and stops the timer 109 (step S805).

(3) Effects of Third and Fourth Embodiments

With the electronic musical instrument 1A or 1B of the third embodiment, the cover 30A or 30B closes, so that the touch panel 20 has a visually pleasing appearance in which the touch panel 20 blends into the exterior member 5 of the electronic musical instrument 1. The player can operate the electronic musical instrument 1A or 1B while having a feeling similar to the feeling of playing an acoustic piano.

[4] Correspondences Between Constituent Elements in Claims and Parts in Preferred Embodiments In the following paragraphs, non-limiting examples of correspondences between various elements recited in the claims below and those described above with respect to various preferred embodiments of the present disclosure are explained.

In the above-mentioned embodiment, detection of an operation with respect to the touch panel 20 or execution of a specific function is an example of a first condition. In the above-mentioned embodiment, reproduction of demonstration of a musical performance, recording, etc. are examples of the predetermined function. The first mode is an example of a first appearance mode, and the second mode is an example of a second appearance mode. The appearance of the touch panel 20 in the first mode is an example of a first visual appearance, and the appearance of the touch panel 20 in the second mode is an example of a second visual appearance.

[5] Characteristics of Embodiments

The display device for a musical instrument and the display switching method of the display device for a musical instrument of the above-mentioned embodiments of the present disclosure include following characteristics.

A display device for a musical instrument according to one aspect of the present disclosure includes a touch panel and a switcher that switches a visual appearance of the touch panel between a first appearance mode and a second appearance mode with the touch panel being in operation in both of the first appearance mode and the second appearance mode such that in a case where the touch panel is in the first appearance mode, the touch panel has a first visual appearance, and in a case where the touch panel is in the second appearance mode, the touch panel has a second visual appearance different from the first visual appearance, wherein of the first visual appearance of the touch panel in the first appearance mode and the second visual appearance of the touch panel in the second appearance mode, the second visual appearance of the touch panel in the second appearance mode more closely resembles a visual appearance of a portion of the musical instrument disposed adjacent to the touch panel than the first visual appearance of the touch panel in the first appearance mode.

The switcher may switch the visual appearance of the touch panel from the second appearance mode to the first appearance mode in a case where a first condition is satisfied, the first condition including detection of an operation with respect to the touch panel.

The first condition may include execution of a predetermined function in the musical instrument.

The switcher may switch the visual appearance of the touch panel from the first appearance mode to the second appearance mode in a case where the first condition remains dissatisfied for a predetermined period of time.

The switcher may cause the touch panel to operate in the second appearance mode during a period in which the musical instrument is engaged in a musical performance.

The switcher may change a lighting mode of the touch panel between the first appearance mode and the second appearance mode.

The switcher may include a polarizer included in the touch panel, and the visual appearance of the touch panel may switch between the first appearance mode and the second appearance mode depending on a position of an observer.

The touch panel may display information to be viewable for an information presentation subject in the first appearance mode.

The portion of the musical instrument disposed adjacent to the touch panel may be an exterior member of the musical instrument.

A size of a field for displaying information on the touch panel may be reduced for the second appearance mode as compared to the first appearance mode.

A degree of correlation between a color of the touch panel and a color of the portion of the musical instrument disposed adjacent to the touch panel in the second appearance mode is higher than the degree of correlation between the color of the touch panel and the color of the portion of the musical instrument disposed adjacent to the touch panel in the first appearance mode.

A degree of correlation between a pattern of the touch panel and a pattern of the portion of the musical instrument disposed adjacent to the touch panel in the second appearance mode may be higher than the degree of correlation between the pattern of the touch panel and the pattern of the portion of the musical instrument disposed adjacent to the touch panel in the first appearance mode.

The pattern of the touch panel may a wood pattern in the second appearance mode.

A method of operating a touch panel of a musical instrument according to another aspect of the present disclosure includes switching a visual appearance of the touch panel between a first appearance mode and a second appearance mode with the touch panel being in operation in both of the first appearance mode and the second appearance mode such that in a case where the touch panel is in the first appearance mode, the touch panel has a first visual appearance, and in a case where the touch panel is in the second appearance mode, the touch panel has a second visual appearance different from the first visual appearance, wherein of the first visual appearance of the touch panel in the first appearance mode and the second visual appearance of the touch panel in the second appearance mode, the second visual appearance of the touch panel in the second appearance mode more closely resembles a visual appearance of a portion of the musical instrument disposed adjacent to the touch panel than the first visual appearance of the touch panel in the first appearance mode.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

We claim:

1. A display device for a musical instrument, comprising:
a touch panel; and
a switcher that switches a visual appearance of the touch panel between a first appearance mode and a second appearance mode with the touch panel being in operation in both of the first appearance mode and the second appearance mode such that in a case where the touch panel is in the first appearance mode, the touch panel has a first visual appearance, and in a case where the touch panel is in the second appearance mode, the touch panel has a second visual appearance different from the first visual appearance,
wherein in a case where the visual appearance of the touch panel is switched between the first appearance mode and the second appearance mode, a first degree of correlation between a pattern of the touch panel and a pattern of the portion of the musical instrument disposed adjacent to the touch panel in the second appearance mode is higher than a second degree of correlation between the pattern of the touch panel and the pattern of the portion of the musical instrument disposed adjacent to the touch panel in the first appearance mode.

2. The display device for a musical instrument according to claim 1, wherein
the switcher switches the visual appearance of the touch panel from the second appearance mode to the first appearance mode in a case where a first condition is satisfied, the first condition including detection of an operation with respect to the touch panel.

3. The display device for a musical instrument according to claim 2, wherein the first condition includes execution of a predetermined function in the musical instrument.

4. The display device for a musical instrument according to claim 2, wherein
the switcher switches the visual appearance of the touch panel from the first appearance mode to the second appearance mode in a case where the first condition remains dissatisfied for a predetermined period of time.

5. The display device for a musical instrument according to claim 1, wherein
the switcher causes the touch panel to operate in the second appearance mode during a period in which the musical instrument is engaged in a musical performance.

6. The display device for a musical instrument according to claim 1, wherein
the switcher changes a lighting mode of the touch panel between the first appearance mode and the second appearance mode.

7. The display device for a musical instrument according to claim 1, wherein
the switcher includes a polarizer included in the touch panel, and the visual appearance of the touch panel switches between the first appearance mode and the second appearance mode depending on a position of an observer.

8. The display device for a musical instrument according to claim 1, wherein
the touch panel displays information to be viewable for an information presentation subject in the first appearance mode.

9. The display device for a musical instrument according to claim 1, wherein
the portion of the musical instrument disposed adjacent to the touch panel is an exterior member of the musical instrument.

10. The display device for a musical instrument according to claim 1, wherein
a size of a field for displaying information on the touch panel is reduced for the second appearance mode as compared to the first appearance mode.

11. The display device for a musical instrument according to claim 1, wherein
the pattern of the touch panel is a wood pattern in the second appearance mode.

12. A method of operating a touch panel of a musical instrument, the method comprising:
switching a visual appearance of the touch panel between a first appearance mode and a second appearance mode with the touch panel being in operation in both of the first appearance mode and the second appearance mode such that in a case where the touch panel is in the first appearance mode, the touch panel has a first visual appearance, and in a case where the touch panel is in the second appearance mode, the touch panel has a second visual appearance different from the first visual appearance,
wherein in a case where the visual appearance of the touch panel is switched between the first appearance mode and the second appearance mode, a first degree of correlation between a pattern of the touch panel and a pattern of the portion of the musical instrument disposed adjacent to the touch panel in the second appearance mode is higher than a second degree of correlation between the pattern of the touch panel and the pattern of the portion of the musical instrument disposed adjacent to the touch panel in the first appearance mode.

* * * * *